United States Patent
Bhrugumalla et al.

(10) Patent No.: US 8,576,293 B2
(45) Date of Patent: Nov. 5, 2013

(54) MULTI-CHANNEL IMAGER

(75) Inventors: Satish Kumar Bhrugumalla, Fremont, CA (US); Simon Kershaw, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 211 days.

(21) Appl. No.: 13/109,811

(22) Filed: May 17, 2011

(65) Prior Publication Data

US 2011/0285866 A1     Nov. 24, 2011

Related U.S. Application Data

(60) Provisional application No. 61/346,020, filed on May 18, 2010.

(51) Int. Cl.
*H04N 7/00* (2011.01)
*H04N 7/18* (2006.01)
*H04N 9/47* (2006.01)

(52) U.S. Cl.
USPC ............ 348/218.1; 348/222.1; 348/373

(58) Field of Classification Search
USPC .................... 348/218.1, 222.1, 373
See application file for complete search history.

(56) References Cited

U.S. PATENT DOCUMENTS

| | | | |
|---|---|---|---|
| 7,899,948 B2 | 3/2011 | Olschner et al. | |
| 2004/0012688 A1* | 1/2004 | Tinnerino et al. | 348/218.1 |
| 2006/0054782 A1* | 3/2006 | Olsen et al. | 250/208.1 |
| 2007/0296617 A1* | 12/2007 | Murata et al. | 341/101 |
| 2009/0125644 A1* | 5/2009 | Yokoyama | 710/11 |
| 2010/0328471 A1 | 12/2010 | Boland et al. | |
| 2011/0149116 A1* | 6/2011 | Kim | 348/231.99 |

OTHER PUBLICATIONS

Lim et al., "A multi-lane MIPI CSI receiver for mobile camera applications" [Online], Aug. 2010 [Retrieved on May 17, 2011]. Retrieved from the Internet: http://ieeexplore.ieee.org/xpl/freeabs_all.jsp?arnumber=5606244.

* cited by examiner

*Primary Examiner* — Gevell Selby
(74) *Attorney, Agent, or Firm* — Treyz Law Group; Louis R. Levenson

(57) ABSTRACT

An imaging system may include a multi-channel image sensor. In a multi-channel image sensor, multiple image streams from a common pixel array may be provided to a common interface transport for output on multiple logic channels. Image streams may include high-definition (HD) video and snapshot image data. Video image data may be resized using resize circuitry on the image sensors. Snapshot image data may be processed by the image sensor. Full-resolution portions of snapshot images may be output concurrently with resized HD video image data on multiple logic channels to an image signal processor. In an alternative embodiment, stack memory on the image sensor may be used to store full-resolution snapshot image data. Full-resolution snapshot image data may then be output concurrently with resized HD video image data at a slower data rate than the video image data.

22 Claims, 5 Drawing Sheets

MULTI-CHANNEL IMAGER

This application claims the benefit of provisional patent application No. 61/346,020, filed May 18, 2010, which is hereby incorporated by reference herein in its entirety.

BACKGROUND

This relates generally to imaging systems, and more particularly, to multi-channel imaging systems in which multiple image streams from the same pixel array share a common interface transport.

Modern electronic devices such as cellular telephones, cameras, video cameras and computers often use digital image sensors. Imagers (i.e., image sensors) may include a two-dimensional array of image sensing pixels. Each pixel receives incident photons (light) and converts the photons into electrical signals. High-speed complementary metal-oxide-semiconductor (CMOS) image pixel arrays enable high-resolution image frames to be read out at high frame rates resulting in, for example, 16 Megapixel images delivered to an image signal processor at 60 frames per second (i,e., 16 Mp60). Many image signal processors cannot process this much data in a streaming mode (e.g., video mode). This creates the need for additional image buffers that buffer an image frame before processing and may require excess amounts of power consumption by the image signal processor. Conventional image sensors may include a resizer circuit to deliver reduced resolution HD video to an image signal processor resulting in smaller amounts of data delivered to an image signal processor and lower power consumption than delivering full resolution streaming data.

Some conventional image sensors include a JPEG compressor for creating JPEG compressed snapshot images which are then combined (e.g., using a multiplexer) with the video stream on a single output channel. JPEG compression of snapshot images reduces the data rate on the output channel, however, valuable image data is lost in both a video resizing and a JPEG compressing operation.

It would therefore be desirable to provide electronic devices with improved image sensors that provide both high-resolution snapshot and resized video image data to an image signal processor.

DETAILED DESCRIPTION

Digital camera modules are widely used in electronic devices such as digital cameras, video cameras, computers, cellular telephones, and other electronic devices. These electronic devices may include image sensors that gather incoming light to capture an image. The image sensors may include image pixel arrays (i.e., arrays of image pixels). The pixels in the image pixel arrays may include photosensitive elements such as photodiodes that convert the incoming light into digital data.

Figure 1:
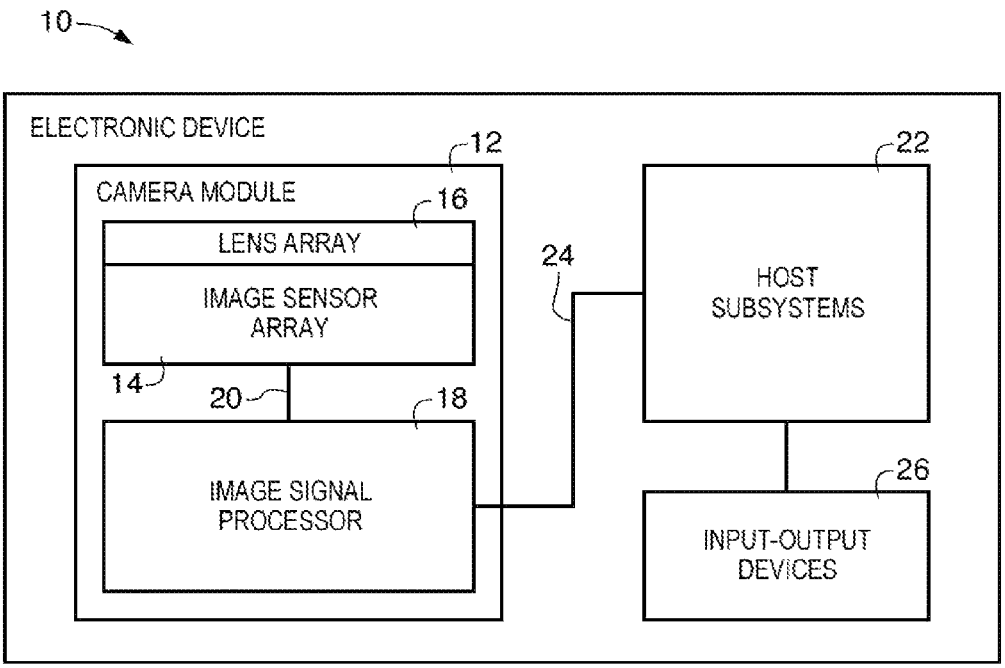
FIG. 1 is a diagram of an illustrative electronic device that includes a multi-channel image sensor and other components in accordance with an embodiment of the present invention.

An electronic device with a digital camera module is shown in FIG. 1. Electronic device 10 may be a digital camera, a video camera, a computer, a cellular telephone, a medical device, or other electronic device. Camera module 12 may include one or more image pixel arrays in image sensor array 14 and one or more lenses in lens array 16. During operation, lenses 16 focus light onto an image pixel arrays associated with image sensor array 14. The image pixel arrays of image sensor array 14 may include photosensitive elements (e.g., photodiodes) that convert the light into digital data. Image pixel arrays may have any number of pixels (e.g., hundreds, thousands, millions, or more). A typical image pixel array may, for example, have millions of pixels (e.g., megapixels). As examples, image sensor array 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, compression circuitry (e.g. circuitry for compressing raw camera images (e.g., to Joint Photographic Experts Group or JPEG format). Image sensor array 14 may, if desired, include resizer circuitry, cropping circuitry, face detection circuitry, pre-processing circuitry, pixel conditioning circuitry, post-processing circuitry, memory, or other circuitry.

There may be any suitable number of lenses in lens array 16 and any suitable number of image sensors in image sensor array 14. Lens array 16 may, as an example, have a single lens and a single corresponding image sensor. If desired, lens array 16 may include N*M individual lenses arranged in an N×M two-dimensional array. The values of N and M may be equal or greater than two, may be equal to or greater than three, may exceed 10, or may have any other suitable values. Image sensor array 14 may contain a corresponding N×M two-dimensional array of individual image sensors. The image sensors may be formed on one or more separate semiconductor substrates. With one suitable arrangement, which is sometimes described herein as an example, the image sensors are formed on a common semiconductor substrate (e.g., a common silicon image sensor integrated circuit die). Each image sensor may be identical or there may be different types of image sensors in a given image sensor array integrated circuit.

Camera module 12 may include an image signal processor (ISP) such as image signal processor 18. Lens array 16 and image sensor array 14 may be mounted in a common package and may provide image data to processing circuitry 18. Still and video image data from image sensor array 14 may be provided to image signal processor 18 via serial interface 20. Image signal processor 18 may be used to perform image processing functions such as data formatting, adjusting white balance and exposure, implementing video image stabilization, face detection, video display processing, image data storage, image preview processing or other functions. Image signal processor 18 may also be used to compress raw camera image files if desired (e.g., to JPEG format). In a typical arrangement, which is sometimes referred to as a system on chip or SOC arrangement, image sensor array 14 and image signal processor 18 are implemented on a common integrated circuit die (i.e. a single block of semiconducting material). The use of a single integrated circuit die to implement image sensor array 14 and image signal processor 18 can help to save space and minimize costs. Image signal processor 18 may contain a single processor core or may contain multiple processor cores.

Camera module 12 (e.g., image signal processor 18) may convey processed still images and video images to host subsystems 22 over path 24. Electronic device 10 typically provides a user with numerous high-level functions. In a computer or advanced cellular telephone, for example, a user may be provided with the ability to run user applications. To implement these functions, host subsystem 22 of electronic device 10 may be coupled to input-output devices 26 such as keypads, input-output ports, joysticks, and displays. Host subsystems 22 may include volatile and nonvolatile memory (e.g., random-access memory, flash memory, hard drives, solid state drives, etc.). Host subsystems 22 may also include microprocessors, microcontrollers, digital signal processors, application specific integrated circuits, etc.

Image sensor array 14 may be configured to capture an image and send the captured image to image signal processor 18 via serial interface 20. Image signal processor 18 may have a processing speed. The processing speed of image signal processor 18 determines a maximum data rate at which image signal processor 18 can process image data. As an example, state of the art mobile device ISPs are able to process up to 300 megapixels per second (mps). Many ISPs process data at less than 300 mps.

Figure 2:
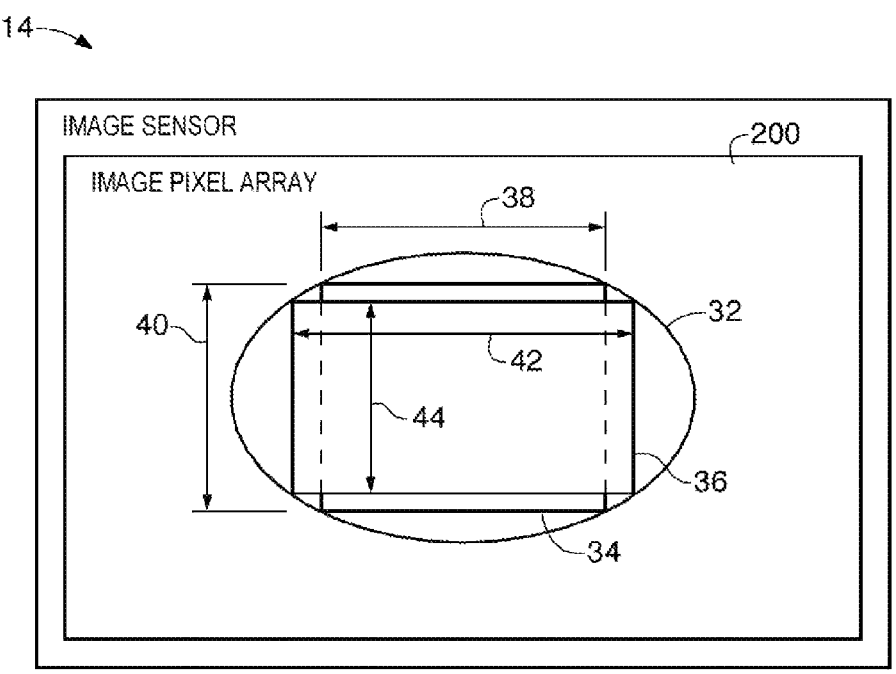
FIG. 2 is an illustrative diagram of a high-resolution image window capable of being captured using a pixel array associated with the image sensor of FIG. 1 in accordance with an embodiment of the present invention.

FIG. 2 is an illustrative diagram of a high-resolution image window capable of being captured using a pixel array such as pixel array 200 of image sensor array 14. Field-of-view (FOV, or window) 32, defined by lens array 16, provides a limiting area in which image pixels may be exposed to light from a real-world scene. FIG. 2 shows two possible snapshots captured by an image pixel array such as image pixel array 14 of electronic device 10 within FOV 32. Snapshot 34 may be a 12 MP snapshot having width 38 and height 40. Width 38 and height 40 may have a 4:3 ratio (i.e., width 38 is fourth thirds of height 40). As an example, width 38 may be 4096 pixels wide while height 40 may be 3072 pixels high. Snapshot 36 may be an 11 MP snapshot having width 42 and height 44. Width 42 and height 44 may have a 16:9 ratio (i.e., width 42 is sixteen ninths of height 44). As an example, width 42 may be 4480 pixels wide while height 44 may be 2520 pixels high.

High-resolution snapshots 34 and 36 have a higher resolution than that required (e.g. 3 MP) for 1080p HD video (1,920 pixels wide by 1,080 high). High resolution frames such as snapshots 34 and 36 are therefore often reduced in resolution (i.e. resized) before being delivered to an ISP. Resized HD video image data, as examples, may be delivered to an image signal processor at a rate of 15 (e.g., 1080p15) or 30 (e.g., 1080p30) frames per second (fps). Combining a 12 MP or 11 MP snapshot with resized 1080p15 or 1080p30 HD video may result in a data rate of approximately 200-500 mps. Conventional image signal processors are unable to handle data rates higher than, for example, 300 mps. Many image signal processors are unable to handle data rates higher than 200 mps. It would therefore be desirable to be able to provide HD video at 15-30 fps along with high-resolution image data to an image signal processor.

Figure 3:
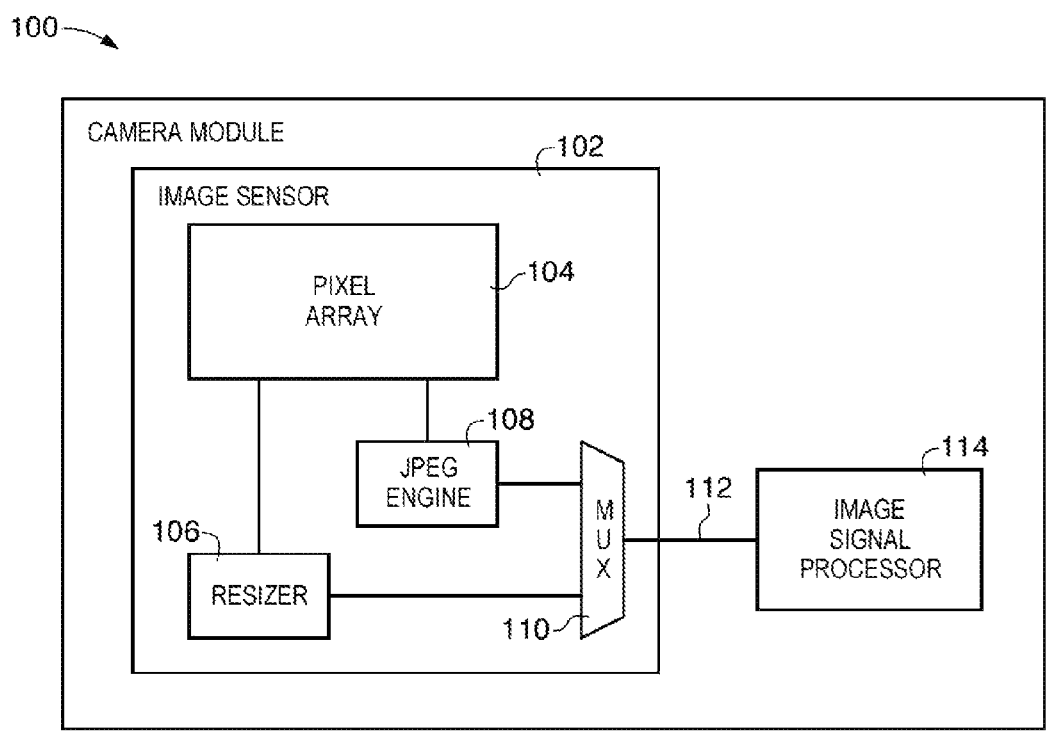
FIG. 3 is a diagram of a conventional camera module that provides resized video image data to an image signal processor.

FIG. 3 is a diagram of a conventional camera module that provides resized video image data to an image signal processor. Conventional camera module 100 includes a pixel array 104 for capturing image data. Video image data captured using pixel array 104 may be resized to lower resolution using resizer 106. Resized video image data may be delivered to an image signal processor such as image signal processor 114 via channel 112. Some conventional devices have a JPEG engine such as JPEG engine 108 for compressing still image data captured using image pixel array 104 for delivery to image signal processor 114. In a conventional device, JPEG compressed image data and resized video image data are combined using a multiplexer (MUX) such as MUX 110 for transport along channel 112 to image signal processor 114. JPEG compressed image data and resized video image data are typically transported in series (i.e., interleaved into a single data stream) along channel 112. Providing JPEG compressed and resized video data to ISP 114 along a single channel 112 may reduce the data rate (i.e., the rate at which data is delivered and must be processed) to an acceptable level for ISP 114. However, both JPEG compression and video resizing result in a loss of valuable image data already captured by image sensor 102. For example, JPEG compressed and resized video data may not have the resolution required for later image processing such as facial recognition or code scanning.

Figure 4:
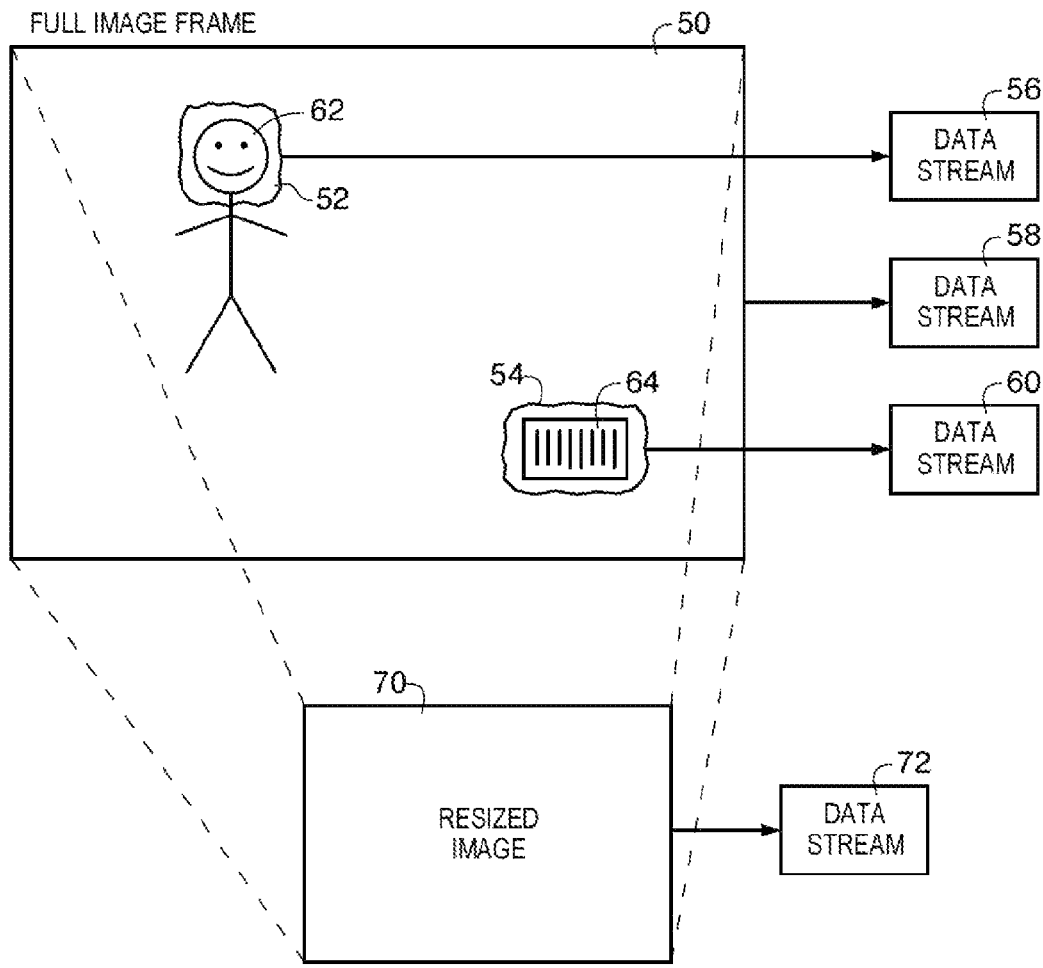
FIG. 4 is a diagram of an illustrative full-resolution image that may be captured using the image sensor of FIG. 1 in accordance with an embodiment of the present invention.

FIG. 4 is a diagram of an illustrative full-resolution image such as full-resolution image 50 that may be captured using image sensor array 14 of FIG. 1. FIG. 2 also contains a resized version of full image 50 such as resized image 70. Resized image 70 may be produced from full image 50 using image sensor array 14 by binning the pixels of image 70 into larger pixels, by digital resizing (e.g., YUV compression) or other methods. Full image frame 50 may be a 12 MP or 11 MP snapshot such as snapshots 34 and 36 respectively of FIG. 2 or may be a full-resolution snapshot of another size (e.g., 16 MP snapshot). Full image 50 may contain objects such as face 62 and bar code 64 in image regions 52 and 64 respectively. Image processing using host subsystems 22 or ISP 18 may require full-resolution images of objects such as face 62 and bar code 64 for processing such as facial recognition processing, code scanning processing or other processing. It would therefore be desirable to provide image sensors capable of delivering full image 50, resized image 72, full-resolution portions 52 and 62 and, if desired, other portions along separate data streams such as data streams 56, 58, 60 and 72, respectively.

Figure 5:
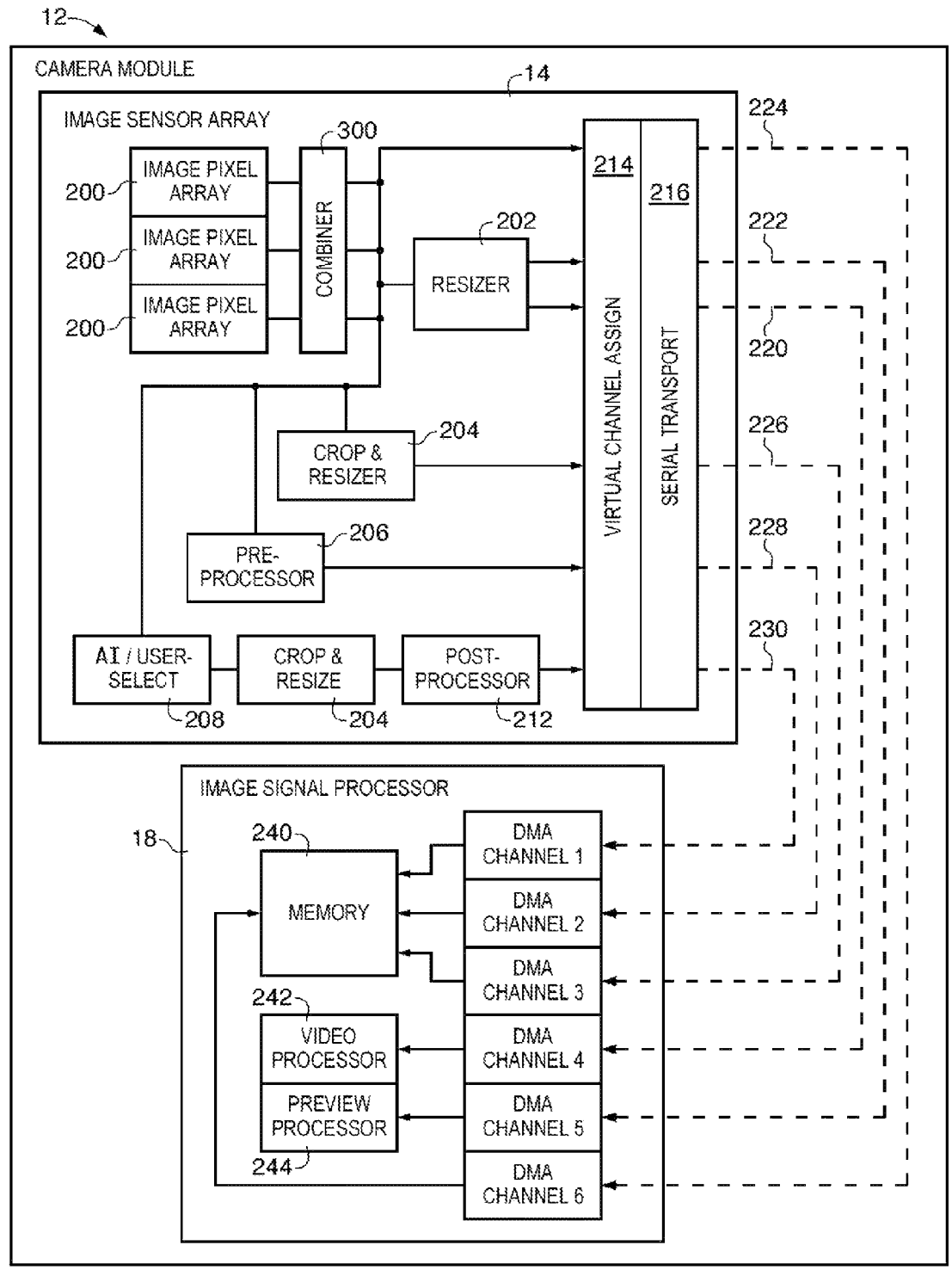
FIG. 5 is a diagram of a camera module capable of delivering multiple image data streams to an image signal processor over multiple channels in accordance with an embodiment of the present invention.

FIG. 5 is a diagram of a camera module capable of delivering multiple image data streams to an image signal processor along multiple channels in accordance with an embodiment of the present invention. Camera module 12 may include an image sensor array 14 and image signal processor 18. Image sensor array 14 may combine one or more image pixel arrays such as image pixel arrays 200 (e.g., a single image pixel array, a 3×1 array of image pixel arrays, etc.) with a serial interface such as serial interface circuit 216 (also referred to herein as serial transport) to provide multiple data streams to ISP 18. Image sensor array 14 and image signal processor 18 may, if desired, be formed from a single integrated circuit die. Serial interface 216 (also called serial transport) may be a multi-lane serial transport or other high-speed serial interface. Serial transport 216 may, for example, be a 4-lane, one gigabyte per second (Gbps) Mobile Industry Processor Interface (MIPI) capable of transporting 400 mps of data.

Image sensor array 14 may include processing circuitry coupled between image pixel arrays 200 and serial transport 216. Processing circuitry may include resize circuitry 202 for resizing video image data (i.e., binning or digitally compressing full images) captured by image pixel arrays 200 into HD (e.g. 3 MP, 1080p) image data. Resize circuitry 202 may resize image data captured by image pixel arrays 200 to other resolutions (e.g., 8 MP, 800 pixel×480 pixel WVGA, or other resolution). Resize circuitry 202 may provide one or more output streams of video data at various resolutions to virtual channel assign circuitry such as virtual channel assign circuitry 214. Each stream may be assigned to a virtual channel by virtual channel assign circuitry 214 and passed to serial transport 216. Virtual channel assign circuitry 214 may be separate from serial transport 216 or may be an integral component of serial transport 216. In the example of FIG. 5, resize circuitry 202 provides two streams of video image data to virtual channel assign circuitry 214 which are output by serial transport 216 on virtual (or logic) channels 220 and 222 respectively. The example of FIG. 5 is merely illustrative, and resize circuitry 202 may provide more or less than two video image data streams that may be output by serial transport 216 on more or less than two logic channels respectively.

Image sensor array 14 may include additional processing circuitry such as crop and resize circuitry 204, pre-processor circuitry 206, artificial-intelligence/user-select (AI/US) circuitry 208, post-processing circuitry 212. Crop and resize circuitry 204 may be used to output cropped images of regions such as regions 52 and 62 of full-resolution image 50 captured by image pixel arrays 200 for delivery to virtual channel assign circuitry 214. Pre-processor circuitry 206 may be used to compress full images captured using image pixel arrays 200 (e.g., to compress full-resolution images into JPEG compressed images), to perform image color transformations, to extract meta-data (e.g., image statistics, image light levels, image noise levels, image motion levels, etc.) from full image 50 or other image processing operations. AI/US circuitry may be used to automatically select regions such as regions 52 and 62 of full-resolution image 50 for cropping by crop and resize circuitry 204. Alternatively, AI/US circuitry by provide image sensor array 14 with a user-select capability for selection (by a user of electronic device 10) of regions of full image 50 for full-resolution delivery to virtual channel assign circuitry 214. If desired, full-resolution cropped images of portions of images captured by image pixel arrays 200, selected by AI/US circuitry 208 and cropped using crop and resize circuitry 204 may be post-processed using post-processor 212 prior to delivery to virtual channel assign circuitry 214. Post-processing circuitry may be used to perform image color transformations, white-balance operations, to extract meta-data from full image 50 or perform other image processing operations.

As shown in FIG. 5, crop and resize circuitry 204, pre-processing circuitry 206, and post-processing circuitry 212 each provide a stream of high or low resolution image data (including full-resolution portions of the full image captured by image pixel arrays 200) to virtual channel assign circuitry 214. Each stream coming from crop and resize circuitry 204, pre-processing circuitry 206, and post-processing circuitry 212 may be assigned to a single logic channel such as logic channels 226, 228, and 230, respectively. Image data from crop and resize circuitry 204, pre-processing circuitry 206, and post-processing circuitry 212 may be delivered (along logic channels 226, 228, and 230 respectively) to DMA channels 1, 2, and 3 of ISP 18. Snapshot data including pre-processed, post-processed, and unprocessed full-resolution portions of full images may be delivered through DMA channels such as DMA channels 1, 2, and 3 and stored in memory 240 on ISP 18.

In addition, if desired, the full-resolution, full image (i.e., full image 50) captured by image pixel arrays 200 may be delivered as a separate stream to virtual channel assign circuitry 214 and output on a separate virtual output channel such as channel 224 to a direct memory access channel such as DMA channel 1 of ISP 18. Full-resolution image 50 may be stored on memory 240 of image signal processor 240 after passing through DMA channel 1 or may be passed to host subsystems 22 for permanent storage or for passage to input-output devices 26. Image data streams originating from resizer 202, crop and resize circuitry 204, pre-processing circuitry 206, and post-processing circuitry 212, may, if desired, be combined (i.e., interleaved) onto fewer output logic channels, if desired.

Image sensor array 14 may, if desired, include combiner circuitry 300 for combining image frames captured by image pixel arrays 200 into a single image frame. Alternatively, each of image pixel arrays 200 may provide corresponding image frames to virtual channel assign circuitry 214 or to other processing circuitry coupled between image pixel arrays 200 and serial transport 216.

ISP 18 may contain memory 240, video processor 242, preview processor 244 or other processors. Memory 240 may include volatile and nonvolatile memory (e.g., random-access memory, flash memory, hard drives, solid state drives, etc.). Memory 240 may receive data from one or more direct memory access (DMA) channels. Video processor 242 may used to process HD (e.g., 1080p) video image data or video image data at other resolutions. Preview processor 244 may used to process reduced resolution video data (i.e., video data at video resolutions significantly lower than HD resolution) for use in displaying continuous view finder images. Data stored on memory 240 may be passed to host subsystems 22 for further processing, permanent storage or display. Data processed by video processor 242 may be passed to host subsystems 22 for further processing, for permanent storage or for display. Data stored in memory 240 or processed by preview processor 244 may be passed to host subsystems 22 for display of viewfinder or video-preview display.

Resizer 202, crop and resize circuitry 204, pre-processor circuitry 206, artificial intelligence (AI)/user-select circuitry 208, post-processing circuitry 212 may be formed, for example, along with image pixel arrays 200 and image signal processor 18 on a single integrated circuit die. In other arrangement, resizer 202, crop and resize circuitry 204, pre-processor circuitry 206, artificial intelligence (AI)/user-select circuitry 208, post-processing circuitry 212 may be formed with image pixel arrays 200 on a single integrated circuit die while image signal processor 18 is formed on a second integrated circuit die. In yet another configuration, resizer 202, crop and resize circuitry 204, pre-processor circuitry 206, artificial intelligence (AI)/user-select circuitry 208, post-processing circuitry 212 may be formed on a single integrated circuit die while image pixel arrays 200 and image signal processor 18 are formed on additional integrated circuit dies.

Figure 6:
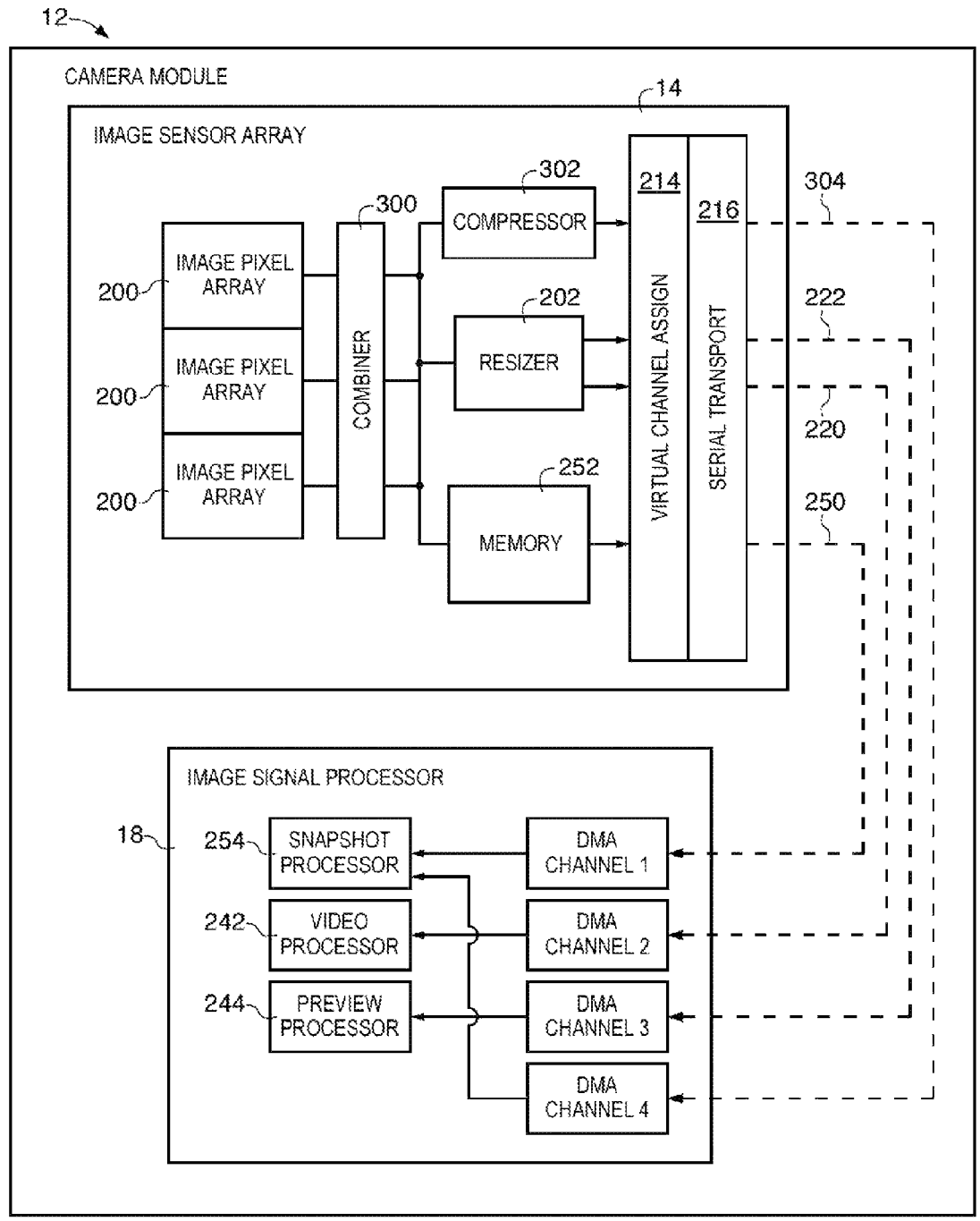
FIG. 6 is an illustrative diagram of an image sensor capable of delivering multiple image data streams over multiple channels to an image signal processor in accordance with another embodiment of the present invention.

FIG. 6 is an illustrative diagram of an image sensor capable of delivering multiple image data streams along multiple channels to an image signal processor in accordance with another embodiment of the present invention. As shown in FIG. 6, image sensor array 14 of camera module 12 may include one or more image pixel arrays such as image pixel arrays 200 (e.g., a single image pixel array, a 3×1 array of image pixel arrays, etc.), resize circuitry 202, compression circuitry 302 and memory 252. Resize circuitry 202 may resize image data captured by image pixel arrays 200 to other resolutions (e.g., 8 MP, 800 pixel×480 pixel WVGA, or other resolution). Resize circuitry 202 may provide one or more output streams of video data at various resolutions to virtual channel assign circuitry such as virtual channel assign circuitry 214. Each stream may be assigned to a virtual channel by virtual channel assign circuitry 214 and passed to serial transport 216. In the example of FIG. 5, resize circuitry 202 provides two streams of video image data to virtual channel assign circuitry 214 which are output by serial transport 216 on virtual (or logic) channels 220 and 222 respectively. The example of FIG. 6 is merely illustrative, and resize circuitry 202 may provide more or less than two video image data streams that may be output by serial transport 216 on more or less than two logic channels respectively.

Image sensor array 14 may, if desired, include combiner circuitry 300 for combining image frames captured by image pixel arrays 200 into a single image frame. Combined image frames by be stored in memory 252 and resized by resize circuitry 202. Alternatively, each image captured by each image pixel array 200 may be processed separately by resize circuitry 202 and stored separately in memory 200 before being delivered to image signal processor 18 by serial transport 216.

Compression circuitry 302 may be configured to receive an image of a scene captured by one of image pixel arrays 200 and output a compressed image of the scene (e.g., a JPEG format image, a GIF format image or other compressed image). If desired, compression circuitry 302 may be configured to receive a combined image (i.e., an image that is a combination of images captured with multiple image pixel arrays 200) from combiner circuitry 300.

Full-resolution images captured using image pixel arrays 200 may be stored on image sensor array 14 using memory 252. Memory 252 may be, for example, memory in which data is added or removed on a last-in-first-out basis or may be dynamic random-access memory (DRAM). Storing full-resolution snapshot image 50 captured by image pixel arrays 200 in DRAM memory 252 on image sensor array 14 may allow snapshot image data to be output (i.e., transmitted from multi-channel image sensor array 14 to image signal processor 18 using serial interface circuitry 216) at a slower rate (e.g., 1 fps) than video output from resizer 202. Snapshot image data stored in stack memory 252 may be delivered to virtual channel assign circuitry 214 and output using serial transport 216 along a separate channel such as channel 250 from video image data streaming from resizer 202.

As shown in FIG. 6, snapshot and video image data may be delivered from image sensor array 14 to ISP 18 using logic channels 220, 222, 250, and 304 to DMA channels 1, 2, 3, and 4 respectively. Snapshot image data stored on memory 252 may be delivered to snapshot processor 254. Compressed image data compressed by compression circuitry 302 may be delivered to snapshot processor 254 along logic channel 304 using DMA channel 4. Snapshot processor 254 may be used to perform image color transformations, white balance operations, to extract meta-data from full image or to perform other image processing operations on full-resolution image data.

Video processor 242 may used to process HD (e.g., 1080p) video image data or video image data at other resolutions. Preview processor 244 may used to process reduced resolution video data (i.e., video data at video resolutions significantly lower than HD resolution) for use in displaying continuous view finder images. Data processed by snapshot processor 254 and video processor 242 may be passed to host subsystems 22 for further processing, for permanent storage or for display. Data processed by preview processor 244 may be passed to host subsystems 22 for display of viewfinder or video-preview display.

Various embodiments have been described illustrating an electronic device having a camera module with a multi-channel image sensor and an image signal processor. The multi-channel image sensor may include at least one array of image pixels for capturing an image of a scene, processing circuitry, and a high-speed serial interface circuit. The serial interface circuit may be a multi-lane MIPI serial transport for transmitting multiple streams of image data along multiple virtual (logic) channels from the multi-channel image sensor to the image signal processor. The processing circuitry may receive images (image data) from the image pixel arrays and generate reduced-resolution video image data including high-definition (HD) 1080p video image data and low-resolution preview video image data for transmission from the multi-channel image sensor to the image signal processor.

The foregoing is merely illustrative of the principles of this invention which can be practiced in other embodiments.

What is claimed is:

1. A multi-channel image sensor coupled to an image signal processor, the multi-channel image sensor comprising:
   an array of image pixels for capturing an image of a scene; and
   a serial interface circuit configured to concurrently transmit a plurality of processed images from the multi-channel image sensor to the image signal processor through a plurality of virtual channels, wherein the serial interface circuit is configured such that each of the plurality of virtual channels is used to transmit a respective one of the plurality of processed images.

2. The multi-channel image sensor of claim 1, further comprising processing circuitry configured to receive the image of the scene from the image pixel array and generate at least some of the plurality of processed images based on the image.

3. The multi-channel image sensor of claim 2 wherein the processing circuitry comprises:
   resize circuitry, configured to receive the image of the scene from the image pixel array, wherein the resize circuitry is configured to output at least one reduced-resolution image of the scene, wherein the at least one reduced-resolution image of the scene has a resolution lower than a resolution of the image of the scene captured by the array of image pixels, and wherein the processed images comprise the at least one reduced-resolution image of the scene.

4. The multi-channel image sensor of claim 3 wherein the processing circuitry further comprises:
   crop and resize circuitry configured to receive the image of the scene from the image pixel array and output a plurality of cropped images, wherein the processed images further comprise the cropped images, and wherein the cropped images each have a resolution that is substantially the same as the resolution of the image of the scene captured by the array of image pixels.

5. The multi-channel image sensor of claim 4 wherein the image pixel array and the processing circuitry are formed as part of a common image sensor integrated circuit die.

6. The multi-channel image sensor of claim 5 wherein the multi-channel image sensor and the image signal processor are formed as part of a common image sensor integrated circuit die.

7. The multi-channel image sensor of claim 6 wherein the processing circuitry further comprises artificial-intelligence/user-select circuitry coupled to the crop and resize circuitry, wherein the artificial-intelligence/user-select circuitry is configured to receive the image of the scene from the image pixel array and select at least one portion of the scene containing an object, and wherein the plurality of images of portions of the scene comprises an image of the at least one portion of the scene containing the object.

8. The multi-channel image sensor of claim 7, further comprising post-processing circuitry configured to receive the cropped images from the crop and resize circuitry and to output a plurality of further processed cropped images.

9. The multi-channel image sensor of claim 8, further comprising virtual channel assign circuitry configured to assign a logic channel to each of the plurality of processed images.

10. The multi-channel image sensor of claim 9 wherein the image captured by the array of image pixels comprises one of a plurality of continuously captured video image frames, wherein the resize circuitry is configured to continuously generate reduced-resolution video image frames from the continuously captured video image frames, and wherein the plurality of processed images include the continuously generated reduced-resolution video image frames.

11. The multi-channel image sensor of claim 2 further comprising:
at least one additional array of image pixels for capturing an additional image of a scene; and
combiner circuitry, wherein the combiner circuitry is configured to combine the additional image of the scene with the image of the scene to form a combined image; and
resize circuitry, configured to receive the combined image from the combiner circuitry, wherein the resize circuitry is configured to output at least one reduced-resolution image of the scene, wherein the at least one additional reduced-resolution image of the scene has a resolution lower than a resolution of the combined image of the scene, and wherein the processed images comprise the at least one reduced-resolution image of the scene.

12. The multi-channel image sensor of claim 3 further comprising:
at least one additional array of image pixels for capturing an additional image of a scene, wherein the resize circuitry is configured to receive the additional image of the scene from the at least one image pixel array, wherein the resize circuitry is configured to output at least one additional reduced-resolution image of the scene, wherein the at least one additional reduced-resolution image of the scene has a resolution lower than a resolution of the additional image of the scene captured by the at least one additional array of image pixels, and wherein the processed images comprise the at least one additional reduced-resolution image of the scene.

13. A multi-channel image sensor coupled to an image signal processor, the multi-channel image sensor comprising:
an array of image pixels for capturing images of a scene;
memory for storing at least one of the images of the scene;
resize circuitry, configured to receive the images of the scene from the array of image pixels and generate reduced-resolution images of the scene, wherein the reduced-resolution images of the scene have a resolution lower than a resolution of the images captured by the array of image pixels; and
compression circuitry configured to receive the images of the scene and output compressed images of the scene, wherein the memory for storing the at least one of the images of the scene comprises stack memory.

14. The multi-channel image sensor of claim 13, further comprising:
a serial interface circuit configured to concurrently transmit the reduced-resolution images of the scene generated by the resize circuitry and the at least one of the images of the scene stored on the memory from the multi-channel image sensor to the image signal processor.

15. The multi-channel image sensor of claim 14, wherein the serial interface circuit comprises a multi-lane serial transport and wherein the multi-lane serial transport is configured to transmit the at least one of the images of the scene at a first data rate, wherein the multi-lane serial transport is configured to transmit the reduced-resolution images of the scene at a second data rate, and wherein the first data rate is slower than the second data rate.

16. The multi-channel image sensor of claim 15 wherein the reduced-resolution images of the scene frames comprise 1080p high-definition images of the scene.

17. An electronic device comprising a camera module and an input-output device, the camera module comprising:
a multi-channel image sensor having an array of image pixels for capturing image data;
at least one lens configured to focus light on the array of image pixels;
an image signal processor; and
a serial interface configured to transmit a plurality of streams of data along a plurality of virtual channels from the multi-channel image sensor to the image signal processor.

18. The electronic device defined in claim 17 wherein the multi-channel image sensor further comprises:
processing circuitry configured to receive the image data from the array of image pixels and generate at least some of the plurality of streams of data to be transmitted along the plurality of virtual channels from the multi-channel image sensor to the image signal processor.

19. The electronic device defined in claim 18 wherein the multi-channel image sensor further comprises virtual channel assign circuitry for assigning a virtual channel to each of the plurality of streams of data, wherein the at least some of the plurality of streams of data generated by the processing circuitry comprises a stream of reduced-resolution 1080p video image data, a stream of reduced-resolution preview video image data and a stream of snapshot image data, wherein the reduced-resolution preview video image data has a resolution lower than the reduced-resolution 1080p video image data, and wherein the snapshot image data has a resolution that is substantially the same as the image data captured by the array of image pixels.

20. The electronic device defined in claim 19 wherein the image signal processor comprises:
memory for storing the snapshot image data;
a video processor for processing the 1080p video image data; and
a preview processor for processing the reduced-resolution preview video image data.

21. The electronic device defined in claim 20 wherein the processing circuitry comprises:
artificial-intelligence/user-select circuitry configured to receive the image data from the array of image pixels and identify at least a portion of the image data containing an object; and
crop and resize circuitry configured to receive the image data from the array of image pixels and output the portion of the image data containing the object, wherein the snapshot image data includes the portion of the image data containing the object.

22. The electronic device defined in claim 21, further comprising:

host subsystems configured to further process the snapshot image data and to provide the reduced-resolution preview video image data processed by the preview processor to a display.

* * * * *